(12) United States Patent
Batten et al.

(10) Patent No.: US 8,002,139 B1
(45) Date of Patent: Aug. 23, 2011

(54) METHOD OF JOINING A PLASTIC TUBE TO ANOTHER TUBE

(75) Inventors: William C. Batten, Asheboro, NC (US); Bruce W. Kyles, Asheboro, NC (US)

(73) Assignee: Thermaco, Inc., Asheboro, NC (US)

( * ) Notice: Subject to any disclaimer, the term of this patent is extended or adjusted under 35 U.S.C. 154(b) by 1891 days.

(21) Appl. No.: 11/117,284

(22) Filed: Apr. 19, 2005

(51) Int. Cl.
*B65D 88/12* (2006.01)

(52) U.S. Cl. ........................................................ 220/563

(58) Field of Classification Search .................. 220/563, 220/562, 601, 661, 720, 86.2, 86.1, 746, 220/745, 694; 206/0.6; 29/507, 506, 522.1; 285/382.5, 382.4; D9/424, 417, 414; *B65D 88/12*
See application file for complete search history.

(56) References Cited

U.S. PATENT DOCUMENTS

| | | | |
|---|---|---|---|
| 1,487,787 A * | 3/1924 | Loeffler | 285/332.1 |
| 1,930,745 A | 10/1930 | Fisher | 113/44 |
| 2,470,546 A * | 5/1949 | Carlson | 285/250 |
| 2,704,104 A | 12/1949 | Mueller | 153/73 |
| 2,552,791 A * | 5/1951 | Johnson | 285/258 |
| 2,748,463 A | 6/1956 | Mueller | 29/523 |
| 3,103,068 A | 9/1963 | Hinz et al. | 29/523 |
| 3,595,047 A | 7/1971 | Fanning et al. | 72/58 |
| 3,615,709 A * | 10/1971 | Ford et al. | 426/411 |
| 3,924,883 A * | 12/1975 | Frank | 285/256 |
| 3,977,068 A | 8/1976 | Krips | 29/421 |
| 4,006,619 A | 2/1977 | Anderson | 72/54 |
| 4,068,372 A | 1/1978 | Kamohara et al. | 29/727 |
| 4,069,573 A | 1/1978 | Rogers, Jr. et al. | 29/421 |
| 4,075,755 A | 2/1978 | Bernatt et al. | 29/623 |
| 4,125,937 A | 11/1978 | Brown et al. | 29/727 |
| 4,152,821 A | 5/1979 | Scott | 29/421 |
| 4,320,568 A | 3/1982 | Herrod et al. | 29/421 |
| 4,334,140 A * | 6/1982 | Morriss, Jr. | 219/127 |
| 4,420,866 A | 12/1983 | Mueller | 29/421 |
| 4,567,631 A | 2/1986 | Kelly | 29/157.3 |
| 4,685,191 A | 8/1987 | Mueller et al. | 29/523 |
| 4,724,693 A | 2/1988 | Tedder | 72/58 |
| 4,779,333 A | 10/1988 | Rabe et al. | 29/727 |
| 4,779,445 A | 10/1988 | Rabe | 72/393 |
| 4,923,226 A * | 5/1990 | Bartholomew | 285/242 |
| 5,040,408 A * | 8/1991 | Webb | 73/40.5 R |
| 5,134,878 A * | 8/1992 | Sharp | 73/49.2 |
| 5,233,739 A * | 8/1993 | Holden et al. | 29/237 |
| 5,829,619 A * | 11/1998 | Gupta et al. | 220/86.2 |
| 6,056,029 A * | 5/2000 | Devall et al. | 141/383 |
| 6,425,444 B1* | 7/2002 | Metcalfe et al. | 166/387 |
| 6,688,653 B1* | 2/2004 | Thrift et al. | 285/148.13 |
| 6,800,195 B1 | 10/2004 | Batten et al. | 210/138 |
| 7,186,346 B1* | 3/2007 | Batten et al. | 210/776 |
| 2001/0054445 A1* | 12/2001 | Evanovich et al. | 137/574 |
| 2002/0003104 A1* | 1/2002 | Evanovich et al. | 210/153 |

* cited by examiner

*Primary Examiner* — Mickey Yu
*Assistant Examiner* — Robert J Hicks
(74) *Attorney, Agent, or Firm* — MacCord Mason PLLC

(57) ABSTRACT

A method of joining a thermoplastic tube to another tube includes orienting a thermoplastic tube within an outer tube, positioning a malleable band within the thermoplastic tube, and expanding the malleable band radially until a seal is formed between the thermoplastic tube and the outer tube. The invention may also be considered an apparatus including a first tube a second tube and a malleable band. The first tube contains a portion of the second tube. The malleable band is expanded radially, forming a seal between the first and second tube.

14 Claims, 5 Drawing Sheets

METHOD OF JOINING A PLASTIC TUBE TO ANOTHER TUBE

BACKGROUND OF THE INVENTION (1) Field of the Invention

The present invention relates generally to a method of joining a plastic tube to another tube, and, in a particular embodiment, to a method of joining a baffle comprising a plastic tube to a tank also having a tube.

(2) Description of the Prior Art

Joining a pair of concentric metallic tubes to form a seal between the tubes is known. One method of joining such tubes includes inserting an elastomeric sleeve within the inner tube and compressing it axially. The elastomeric sleeve expands radially against the inner tube and, if enough compressive force is applied, the sleeve deforms the inner tube so it engages the outer tube. An annularly enlarged portion of the tubes results from a resulting radial force having been applied from within the tubes. This annularly enlarged portion forms a joint between the tubes.

The ends of tubes such as polyvinyl chloride (PVC) pipes are also often joined in male/female fashion. However, PVC pipes are often joined with PVC glue or cement, a composition including PVC resin. Other thermoplastic materials such as polyethylene and polyurethane are not as susceptible to gluing or cementing. Thus, where it is desirable to join a polyethylene or polyurethane tubular member to another tube, welding the parts together is often necessary. This process may be labor intensive and time consuming.

Thus, there remains a need for a new method of joining a thermoplastic tube to another tube. Specifically, where the thermoplastic tube is a polyethylene or polyurethane part of a grease separator tank baffle, a new method of joining the baffle to the tank is needed.

SUMMARY OF THE INVENTION

The present invention solves one or more of these needs in the art by providing a method of joining a thermoplastic tube to another tube comprising: orienting a thermoplastic tube within an outer tube; positioning a malleable band within the thermoplastic tube; and expanding the malleable band radially until a seal is formed between the thermoplastic tube and the outer tube.

One aspect of the present invention is to provide a method of joining an interior baffle to a tank for a grease separator including: configuring a housing having a plastic tube extending outwardly from a side of the housing. A baffle is inserted into the tank so that a plastic tube of the baffle is disposed within a tube of the tank, and a malleable band is inserted in the plastic tube of the baffle. A tool having an elastomeric sleeve is inserted into the plastic tube of the baffle such that the elastomeric sleeve is within the malleable band in the plastic tube. The tool is operated to compress the elastomeric sleeve axially to expand the elastomeric sleeve radially and force the malleable band radially outward until the plastic tube of the baffle contacts the tube of the housing and forms a watertight seal between the tubes.

Another aspect of the present invention is to provide a method of joining substantially concentrically disposed plastic tubes comprising expanding a malleable band within an inner tube to form a seal between it and an outer tube.

In one embodiment, the present invention provides a tank having a tank housing and a rotomolded, thermoplastic baffle, the baffle comprising a tube and a malleable band positioned within the tube, the baffle positioned in relation to the tank housing to form a watertight seal between a the tube of the baffle and a tubular portion of the tank housing.

Yet another aspect is to provide a substantially dog bone shaped assembly comprising first and second rotomolded, polyethylene or polyurethane parts, each part having a tubular portion, the tubular portion of the first part extending within the tubular portion of the second part, the assembly further comprising a malleable band disposed within and deforming the tubular portion of the first part to form a joint with the tubular portion of the second part.

These and other aspects of the present invention will become apparent to those skilled in the art after a reading of the following description of the preferred embodiment when considered with the drawings.

DESCRIPTION OF THE PREFERRED EMBODIMENTS

The illustrations and descriptions are for the purpose of describing an embodiment of the invention. Those of ordinary skill in the art will recognize that the invention defined by the claims is capable of various and numerous embodiments.

Figure 1:
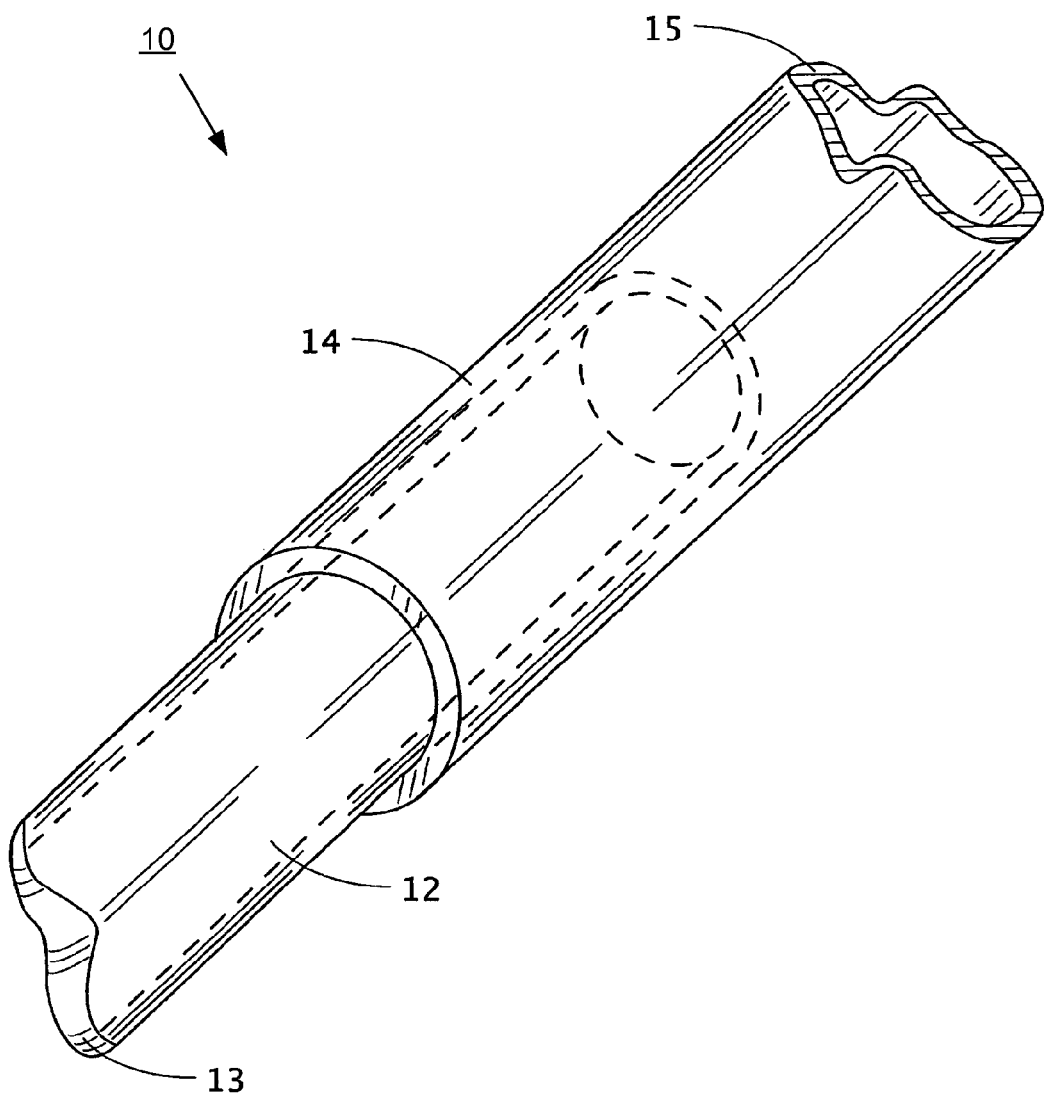
FIG. 1 is a side perspective view of a pair of cylindrical tubes wherein the inner tube is disposed within the outer tube according to an embodiment of the invention.

FIG. 1 illustrates an embodiment of a pair of cylindrical tubes 10 wherein the inner tube 12 is disposed within the outer tube 14. The tubes 10 need not be cylindrical, nor does one need to be concentrically disposed within the other to practice embodiments of the invention. It is enough that the inner tube 12 or a portion thereof is within the outer tube 14. In an embodiment of the invention, the inner tube 12 is a roto-molded polyethylene or polyurethane part. The outer tube 14 is not necessarily a rotomolded thermoplastic material, but may be. The ends of the tubes 13 and 15 may extend indefinitely, or may be shaped in any other desired manner.

Figure 2:
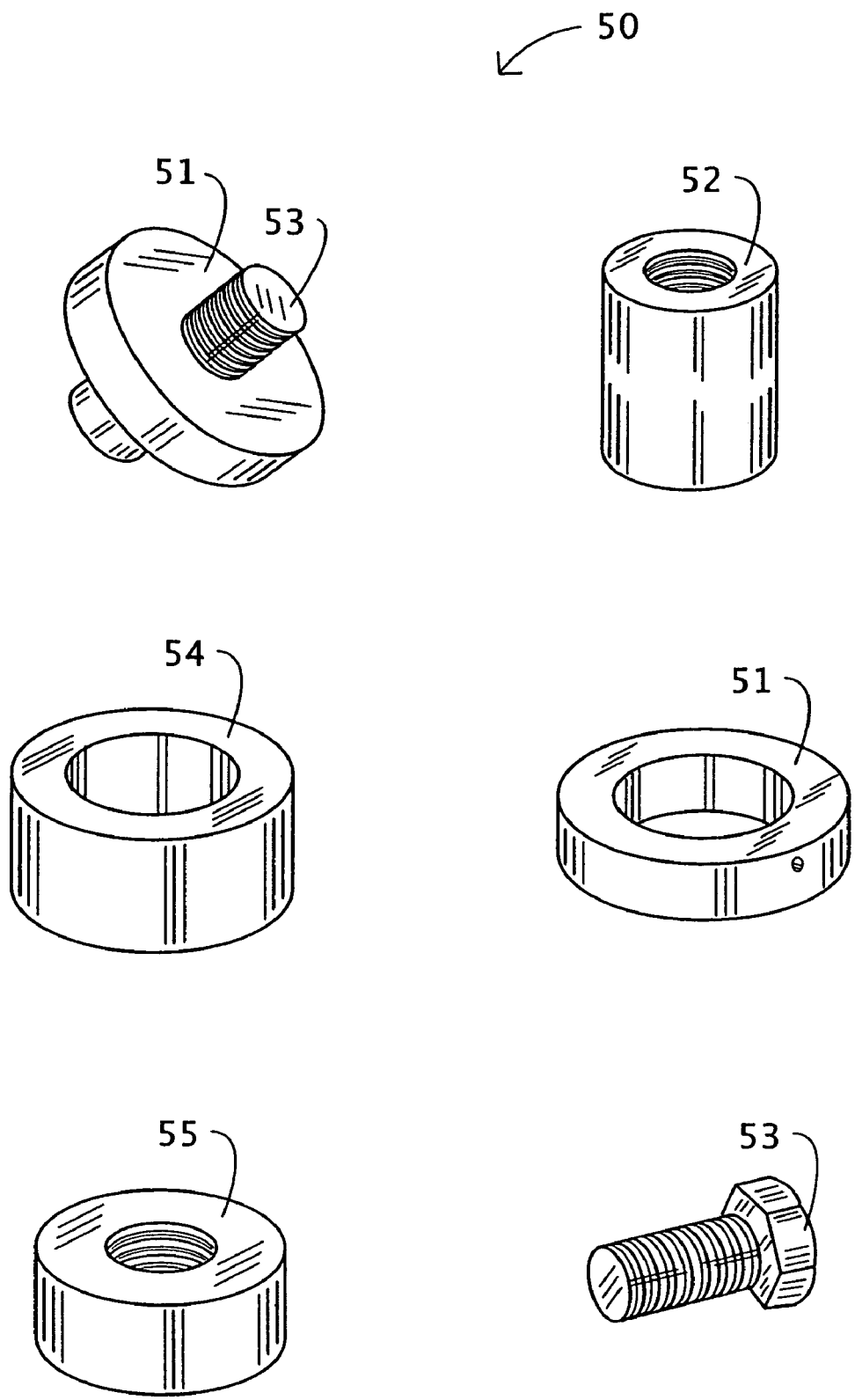
FIG. 2 is a side perspective exploded view of a tool for joining a thermoplastic tube to another tube.
Figure 3:
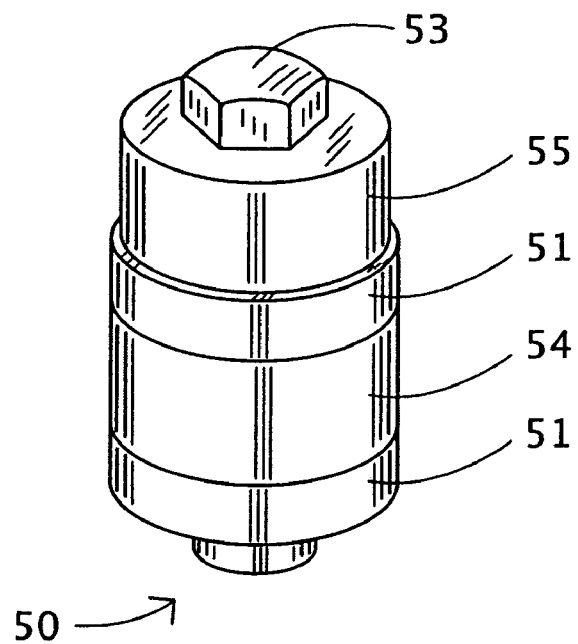
FIG. 3 is a side perspective view of the tool of FIG. 2 with the parts assembled for joining a thermoplastic tube to another tube.

FIGS. 2 and 3 illustrate an embodiment of a tool 50 useful for practicing an embodiment of the invention. FIG. 2 is an exploded view of the tool 50, while FIG. 3 shows the tool 50 assembled. The tool 50 includes a metal collar 55 at one end through which a bolt 53 extends. Metal collars 51 are positioned at each opposing end of an elastomeric sleeve 54. Within the elastomeric sleeve 54 is a threaded metal cylinder 52. Two bolts 53 pass through each of the collars to the threaded metal cylinder 52. When one or both of the bolts 53 are rotated into the threads in the metal cylinder 52, the collars 51 are axially forced toward each other, axially compressing the elastomeric sleeve 54. This axial compressive force distorts the elastomeric sleeve 54 to transfer a radial force to an object surrounding the sleeve 54 in a manner that is known. U.S. Pat. Nos. 2,748,463 to Mueller, 3,595,047 to Fanning et al., 4,075,755 to Bernatt et al., and 4,420,866 to Mueller disclose similar tools and this disclosure incorporates the entirety of those patent disclosures herein by reference.

While in the preferred embodiment of the invention, an elastomeric sleeve 54 is employed to expand the malleable band, any hand or power tool capable of exerting a radial force can be used. For example an expandable ring outside of a pneumatic or hydraulic chamber in communication with a pressurized gas or fluid source may be used to expand the malleable band. In the alternative, the gas or hydraulic chamber may flexibly constructed be to be inserted within the malleable band and expanded with pressurized gas or fluid. In addition, an electric motor or solenoids powering a radial expansion of a ring can also be used to expand the malleable band. Furthermore, a hand tool having a ratchet and lever mechanism for expanding the malleable ring can be used. Any tool producing an outward radial force on the band can be used to practice the invention.

Figure 4:
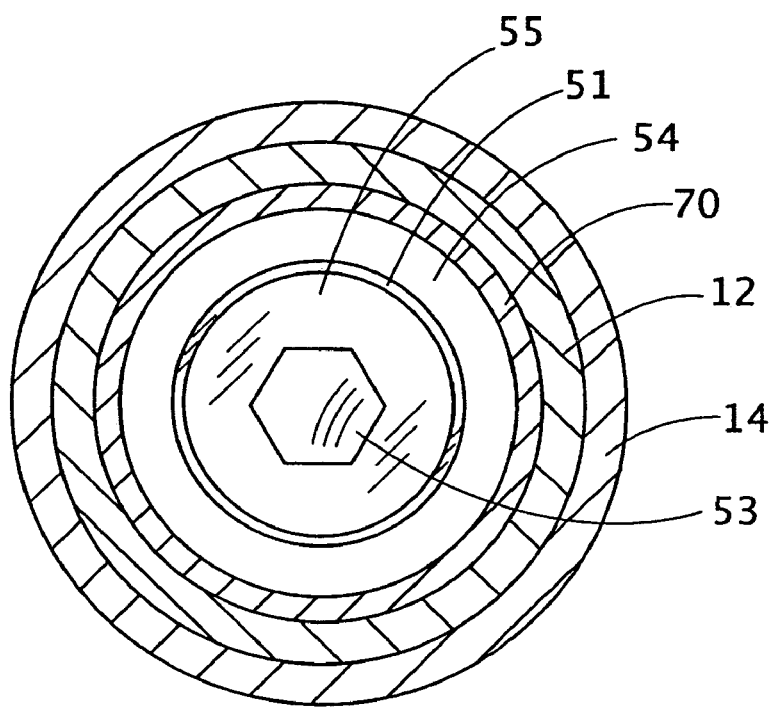
FIG. 4 is a top view of the tool and a malleable band within a pair of cylindrical tubes.

FIG. 4 illustrates the tool positioned within a malleable band 70, which, in a preferred embodiment of the invention, comprises copper. Other malleable metals and combinations thereof can be used. The malleable band 70 is positioned within the inner tube 12. With the tool 50 and malleable band 70 positioned as shown in FIG. 4, one or both of the bolts 53 can be rotated into the metal cylinder shown in FIG. 2 to expand the radius of the malleable band 70. When the malleable band 70 expands outwardly into engagement the inner tube 12, the inner tube 12 deforms and bulges outwardly towards and into contact with the outer tube 14. At this point, any lack of concentricity of the tubes will be removed as the tubes conform to one another. Once the inner tube 12 is expanded sufficiently, a watertight seal is formed between the inner tube 12 and the outer tube 14. The bolts can be reversed to allow the elastomeric sleeve 54 to return to its normal shape, releasing contact with the side of the malleable band 70. The tool 50 may then be removed from within the malleable band 70. The band 70 stays in place, permanently deformed, and permanently holding the inner tube 12 in engagement with the outer tube 14.

Figure 5:
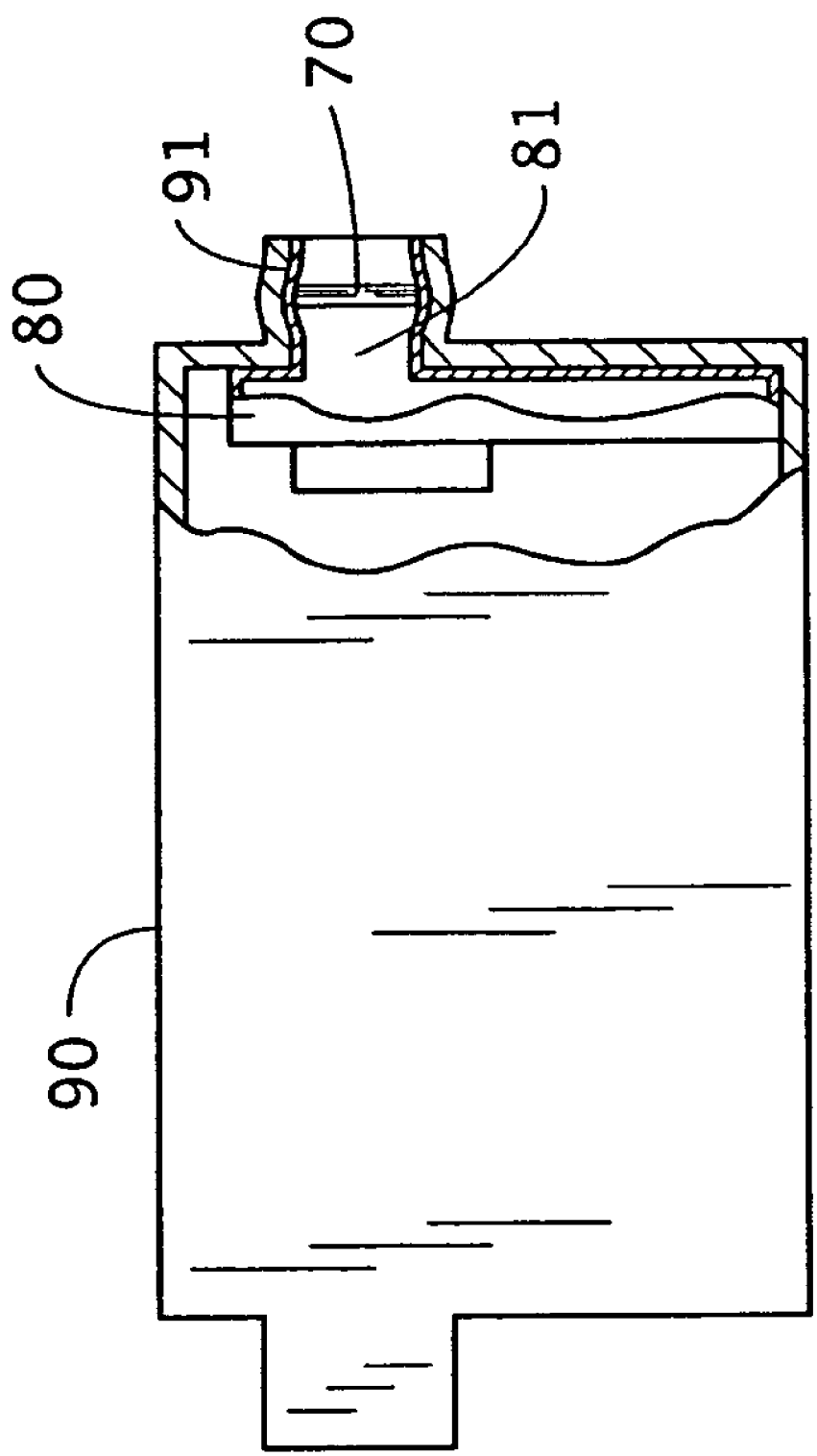
FIG. 5 is a side cross sectional view of a baffle and tank housing constructed according to an embodiment of the invention.

FIG. 5 illustrates an application of an embodiment of the invention to the field of oil/grease separators for commercial kitchen sinks. A rotomolded polyethylene or polyurethane baffle 80 is positioned within a separator housing 90 so that a tube 81 of the baffle 80 is disposed within a tube 91 of the separator housing 90. Within the tube of the baffle is a malleable band 70 that can be expanded radially with a tool to form a watertight seal between the baffle 80 and the separator housing 90. U.S. Pat. No. 6,800,195 to Batten et al. discloses an oil/grease separator having a housing and an inner baffle that may be joined in this manner. The entirety of the disclosure of U.S. Pat. No. 6,800,195 to Batten et al. is incorporated herein by reference.

Figure 6:
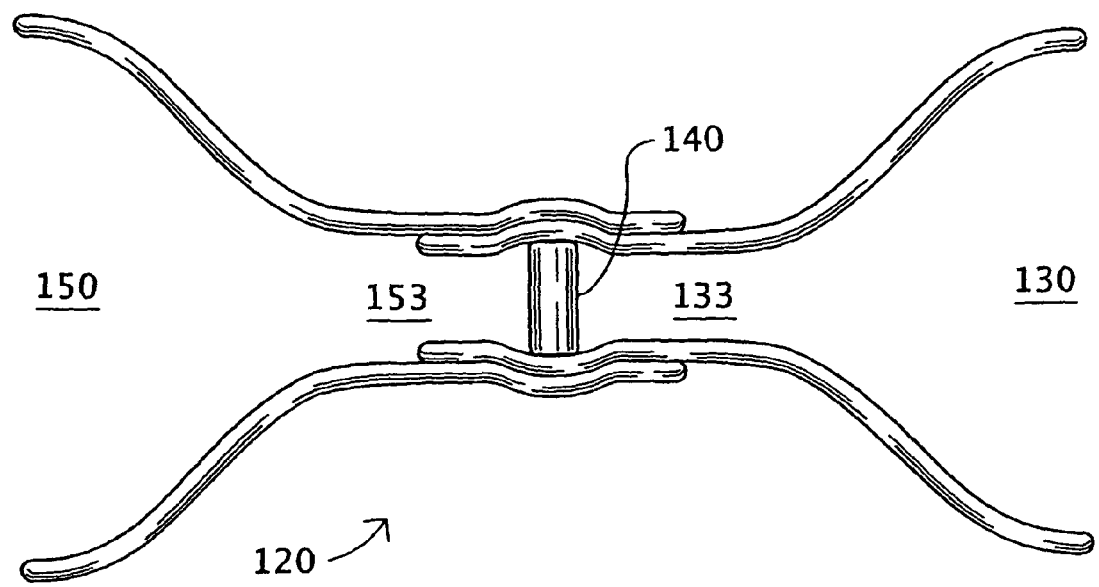
FIG. 6 is a side cross sectional view of a dog bone shaped assembly according to an embodiment of the invention.

FIG. 6 illustrates a substantially dog bone shaped assembly 120. The assembly 120 includes a rotomolded, polyethylene or polyurethane part 130 having a tubular portion 133 and a malleable band 140. The tubular portion 133 of the part 130 is substantially disposed within and joined at a tubular portion 153 of another part 150 to form the dog bone shaped assembly 120. The part 150 may be rotomolded. This technique enables low cost formation of rotomolded parts. Rotomolded parts having two larger ends connected by a narrow portion are difficult to rotomold, and this technique lets such shapes be made with low-cost rotomolded parts. Such shapes are referred to herein as "dog bone."

Various modifications and improvements will occur to those skilled in the art upon a reading of the foregoing description. Such modifications and improvements, whether or not they are described herein, may certainly fall within the scope of the following claims.

We claim:

1. A tank comprising
   a tank housing having a first tube extending therefrom and
   a rotomolded, thermoplastic baffle having a second tube extending therefrom, the baffle positioned in relation to the tank housing such that the second tube is within the first tube, and
   an expanded, malleable band positioned within the second tube forming a watertight seal between the second tube of the baffle and the first tube of the tank housing.

2. The tank according to claim 1 wherein the malleable band has been expanded by inserting a means for expanding the malleable band into the thermoplastic tube.

3. The tank according to claim 2 wherein the means for expanding the malleable band comprises a tool including an elastomeric sleeve.

4. The tank according to claim 3 wherein expanding the malleable band comprises compressing the elastomeric sleeve axially.

5. The tank according to claim 4 wherein the expanding the malleable band includes positioning the elastomeric sleeve substantially adjacent the malleable band within the thermoplastic tube.

6. The tank according to claim 1 wherein the tank housing is made of polyethylene or polyurethane.

7. A tank as claimed in claim 1 wherein the tubes are joined in a watertight joint.

8. A tank as claimed in claim 1 wherein the first tube is thermoplastic.

9. A tank as claimed in claim 1 wherein the second tube is polyethylene or polyurethane.

10. A tank as claimed in claim 1 wherein the baffle is positioned inside of the tank housing.

11. A tank as claimed in claim 1 wherein the malleable band is metal.

12. A tank as claimed in claim 1 wherein the malleable band contacts the second tube to urge it outward into direct sealing engagement with the first tube.

13. A tank as claimed in claim 1 wherein the first tube and the tank are integral.

14. A tank as claimed in claim 1 wherein the baffle and second tube are integral.

* * * * *